G. H. DAY.
OPHTHALMIC MOUNTING.
APPLICATION FILED OCT. 7, 1916.
1,282,050.
Patented Oct. 22, 1918.
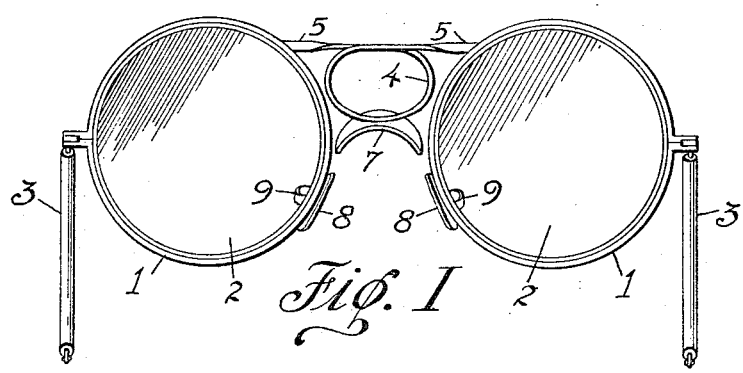
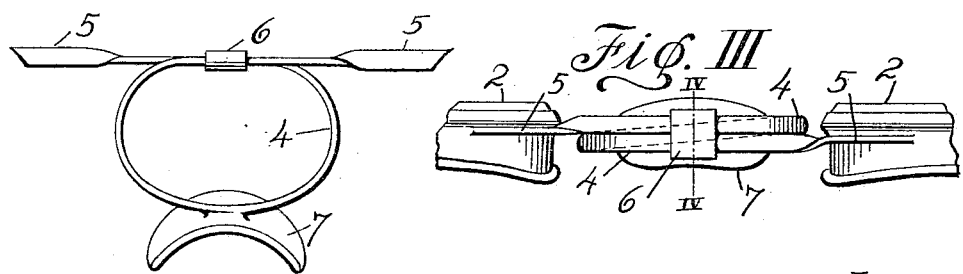
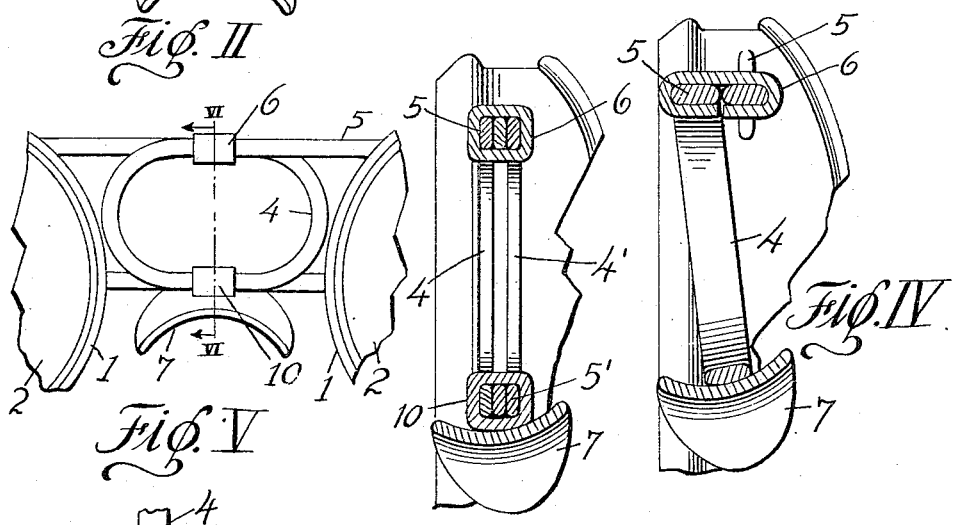
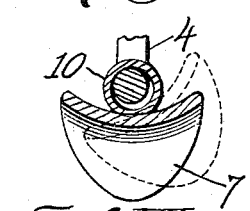
INVENTOR
George H. Day
BY
H. H. Styll  H. K. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,282,050.  Specification of Letters Patent.  Patented Oct. 22, 1918.

Application filed October 7, 1916. Serial No. 124,263.

*To all whom it may concern:*

Be it known that I, GEORGE H. DAY, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to novel and improved lens connecting means.

One of the leading objects of the present invention is the provision of novel and improved lens connecting means which may be readily adjusted to vary the distance between lenses as desired.

A further object of the invention is the provision of an improved structure of this nature in which the lenses are secured against accidental twisting movement and normally braced against drooping movement about the middle of their connection as a center.

A further object of the invention resides in the provision of a novel and improved center which may be employed either solely for adjustment purposes or for both adjustment and securing purposes as may be desired.

Another object of the invention resides in the provision of novel combination and arrangement of parts particularly adapted for use in connection with an eye protector or other heavy mounting, which will insure most comfortable fitting and permit of ready adjustment of the several parts to the particular facial configuration of the wearer as desired.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting embodying my several improvements.

Fig. II represents an enlarged detail front view of the bridge or connecting member.

Fig. III represents a top plan view of the entire construction.

Fig. IV represents a sectional view taken as on the line IV—IV of Fig. III.

Fig. V represents a front view of a slightly modified construction.

Fig. VI represents a sectional view on the line VI—VI of Fig. V.

Fig. VII represents a detail view of a self adjusting nose guard.

In the drawings, the numeral 1 designates the lens frames which may be of any usual or ordinary construction, to retain in position the lenses 2 and which are preferably provided at their outer ends with the temples or retaining devices 3, to partially or entirely retain the mounting in position on the face of the wearer.

Connecting the lens frames 1, I have illustrated my improved center, comprising the central spiral portion 4, preferably with its material disposed anteroposteriorly, having its exit portions twisted just outside the loop or circle 4 to bring the material into a vertical plane terminating in the two vertically disposed end portions 5, each secured to an adjacent ring.

To secure the two ends of the ring together and prevent relative twisting of the parts, brace them against accidental displacement from correct adjustment and guide them in adjusting movements, I preferably place around the parts and closing the ring 4, the sleeve or band 6, as is most clearly illustrated in Figs. III and IV, the band closely embracing the adjacent or overlapping portions of the spiral 4 but permitting of relatively longitudinal sliding movement of the parts as desired.

Secured centrally to the bottom of the ring or spiral 4 I have illustrated the crest rest or nose engaging member 7 adapted to rest on the center or crest of the nose to support the larger part of the weight of the mounting and correctly position it upon the face. In addition if desired I may secure to each of the frames 1 the gripping or nose side engaging guard members 8 connected to the frame 1, preferably as by a looped arm 9, permitting of adjustment of the guards to exactly fit the nose of the wearer.

In the use of my improved construction the bridge may be made of either soft ductile material capable only of adjustment of the bridge to vary the pupillary distance and relative position of the lenses to exactly fit the wearer, or may if preferred be made of regular optical spring material. I here mention optical spring material on account of the fact that it is customary in connection with optical mountings, or what is known as spring bridge constructions, to make the spring material of such character that it may be bent or twisted as desired and will retain the desired bending adjustment and at the same time will possess sufficient spring or resiliency to resist ordinary tensioning and to return the parts to normal position, as for instance in the ordinary spring bridge eyeglass, in which the spring while capable of adjustment serves to retain the mounting in position on the face.

Similarly, in connection with my present construction when the bridge is made of spring material the lenses may be separated by a parallel sliding movement, the upper portions of the member 4 sliding through the guide sleeve or member 6, with a parallel movement permitting of separation of the lenses by condensing of the spring coil 4 until the lenses have been separated sufficiently to allow the guards to engage the nose. On releasing the lenses the coil 4 will expand, bringing the guards 8 into clamping engagement with the nose to partially or entirely retain the mounting in position, insuring a firm fit of the mounting on the face and preventing accidental slipping under ordinary usage.

It will be understood that this construction may be used either alone or in connection with temples, it being preferable in the case of an eye protector or the like having heavy rims, to use the temples as a supplemental steadying device when the clamping guards 8 are employed.

In Figs. V and VI, I have illustrated a further slight modification of my construction, in which in addition to the lens connecting member comprising the portions 4 and 5, I have made use of a second member including the portions 4' and 5', oppositely disposed as respects the members 4 and 5, that is to say, the ring 4' extends upwardly in place of downwardly, while the parts 5' are at the bottom in place of the top of the ring.

It will be noted particularly by reference to Fig. VI, that I have shown the center of the free portion of the ring 4' as secured to the sleeve 6, while I have shown the ends of the portion 4' as sliding through the sleeve 10, which is secured at the one side to the nose rest 7 and at the other side to the bottom of the loop or ring 4. In this way the parts relatively brace each other, the sleeve 6 being held against any longitudinal sliding movement on account of its rigid attachment to the member 4', while the sleeve 10 and nose rest 7 are held on account of their rigid attachment to the ring 4, each of the sleeves serving as a guide for the relatively sliding pair of arms 5 or 5', as the case may be, and the sleeves 6 and 10 together securely holding the parts together for sliding movement for parallel separation or approach of the lenses, while to a maximum resisting any drooping, twisting or other distorting movement.

From the foregoing description taken in connection with the drawings it will be seen that I have provided a novel and improved construction of bridge or lens connecting means, permitting of ready permanent adjustment of the parts by increasing or decreasing the size of the loop or ring 4, as may prove necessary, which ring 4 may also be adjusted by flattening or elongating to bring the crest engaging member 7 into exact desired position, which position the several parts will normally occupy.

It will be seen that in addition I have provided an improved construction in which by a parallel sliding movement the lenses may be temporarily separated against the spring of the coil 4 and when released will come back together to bring the guards 8 into clamping engagement with the sides of the nose to partially or entirely retain the mounting in position on the face, as may be desired.

It will further be understood that if preferred I may have the nose crest pad or member mounted for loose or swinging movement on the ring 4, as illustrated in Fig. VII, thus allowing it to automatically adjust itself to the nose of the wearer.

I claim:

1. In a device of the character described, a bridging or lens-connecting member comprising a flat piece of material having an attached portion disposed in a vertical plane twisted and bent into a loop having the greater width of the material disposed transversely of the loop terminating in a second twisted portion with its plane parallel to the first mentioned part, and a nose bearing member centrally secured to and depending from the ring for engagement for the nose of the wearer.

2. In a device of the character described, the combination with a central resilient adjustable ring, of a sleeve embracing the termini of the ring and holding the parts in close engagement one with the other to close the ring, the said termini being continued in outwardly projecting portions bearing lens attachments, and a nose engaging member secured to the ring at a point diametrically opposite the sleeve.

In testimony whereof I affix my signature in the presence of two witnesses.

GEORGE H. DAY.

Witnesses:
H. K. PARSONS,
E. M. HALVORSEN.

Copies of this patent may be obtained for five cents each, by addressing the "Commissioner of Patents, Washington, D. C."